(12) United States Patent
Klauser et al.

(10) Patent No.: US 9,450,819 B2
(45) Date of Patent: Sep. 20, 2016

(54) AUTONOMIC NETWORK SENTINELS

(71) Applicants: Bruno Klauser, Oberrohrdorf (CH);
Alexander L. Clemm, Los Gatos, CA (US)

(72) Inventors: Bruno Klauser, Oberrohrdorf (CH);
Alexander L. Clemm, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 323 days.

(21) Appl. No.: 13/650,651

(22) Filed: Oct. 12, 2012

(65) Prior Publication Data

US 2014/0108319 A1  Apr. 17, 2014

(51) Int. Cl.
*H04L 29/06* (2006.01)
*H04L 12/24* (2006.01)
*H04L 12/26* (2006.01)
*G06N 5/02* (2006.01)

(52) U.S. Cl.
CPC ............. *H04L 41/0816* (2013.01); *G06N 5/02* (2013.01); *H04L 43/08* (2013.01)

(58) Field of Classification Search
CPC ...... H04L 41/0816; H04L 43/08; G06N 5/02
USPC .............................................. 726/23, 11, 25
See application file for complete search history.

(56) References Cited

U.S. PATENT DOCUMENTS

| | | | | |
|---|---|---|---|---|
| 6,567,408 B1 * | 5/2003 | Li | ...................... | H04L 12/5601 370/395.31 |
| 7,246,156 B2 * | 7/2007 | Ginter | ...................... | G06F 21/55 709/217 |
| 7,779,119 B2 * | 8/2010 | Ginter | ...................... | G06F 21/55 709/219 |
| 8,418,240 B2 * | 4/2013 | Wool | ...................... | G06F 21/604 726/11 |
| 2002/0143934 A1 | 10/2002 | Barker | | |
| 2003/0018643 A1 * | 1/2003 | Mi | ...................... | G06F 11/0709 |
| 2003/0110192 A1 * | 6/2003 | Valente | ...................... | G06F 21/50 715/234 |
| 2003/0120622 A1 * | 6/2003 | Nurmela | ............. | H04L 63/0227 706/47 |
| 2004/0098311 A1 * | 5/2004 | Nair | ...................... | G06Q 30/0601 705/26.1 |
| 2004/0111638 A1 * | 6/2004 | Yadav | ................. | H04L 63/1458 726/23 |
| 2004/0193943 A1 * | 9/2004 | Angelino | ............ | H04L 63/1408 714/4.1 |

(Continued)

FOREIGN PATENT DOCUMENTS

| | | |
|---|---|---|
| CN | 1666461 A | 9/2005 |
| CN | 1820262 A | 8/2006 |
| EP | 2 139 164 A1 | 12/2009 |

OTHER PUBLICATIONS

European Patent Office, "Search Report" in application No. PCT/US2013/064325, dated Jan. 13, 2015, 4 pages.

(Continued)

*Primary Examiner* — David García Cervetti
(74) *Attorney, Agent, or Firm* — Hickman Palermo Becker Bingham LLP; Malgorzata A. Kulczycka (57) ABSTRACT

Autonomic network sentinels are disclosed. An occurrence of a particular network condition is detected at a network entity. The network entity compares the particular network condition with one or more sample set rules of a first sample set of rules associated with the first network entity. The first sample set of rules comprise one or more rules from a full set of rules stored at a rule base. Each rule from the full set of rules represents a network condition and an action to be taken in response to an occurrence of the network condition. In response to determining that the particular network condition matches a particular rule from the first sample set of rules, the network entity notifies the rule base or one or more second network entities of the match.

21 Claims, 6 Drawing Sheets

(56) References Cited

U.S. PATENT DOCUMENTS

| | | | |
|---|---|---|---|
| 2004/0210320 A1* | 10/2004 | Pandya | H04L 29/06 700/1 |
| 2004/0255151 A1* | 12/2004 | Mei | H04L 63/20 726/25 |
| 2005/0015624 A1* | 1/2005 | Ginter | G06F 21/55 726/4 |
| 2005/0182969 A1* | 8/2005 | Ginter | G06F 21/55 726/5 |
| 2006/0023741 A1* | 2/2006 | Charzinski | H04L 29/06 370/465 |
| 2006/0195896 A1* | 8/2006 | Fulp | H04L 63/0263 726/11 |
| 2006/0288409 A1* | 12/2006 | Bartal | H04L 41/0893 726/11 |
| 2007/0006293 A1* | 1/2007 | Balakrishnan | H04L 63/0245 726/13 |
| 2007/0050777 A1* | 3/2007 | Hutchinson | G06F 11/0709 718/104 |
| 2007/0094201 A1* | 4/2007 | Dejean | G06F 17/2247 706/47 |
| 2007/0136813 A1* | 6/2007 | Wong | G06F 21/552 726/25 |
| 2007/0294369 A1* | 12/2007 | Ginter | G06F 21/55 709/217 |
| 2008/0148382 A1* | 6/2008 | Bartholomy | H04L 12/66 726/11 |
| 2008/0209033 A1* | 8/2008 | Ginter | G06F 21/55 709/224 |
| 2009/0172800 A1* | 7/2009 | Wool | G06F 21/604 726/11 |
| 2009/0271504 A1* | 10/2009 | Ginter | G05B 23/0213 709/220 |
| 2009/0313198 A1 | 12/2009 | Kudo et al. | |
| 2010/0023598 A9* | 1/2010 | Ginter | G06F 21/55 709/217 |
| 2010/0064039 A9* | 3/2010 | Ginter | G06F 21/55 709/224 |
| 2010/0299741 A1* | 11/2010 | Harrison | H04L 63/0281 726/12 |
| 2011/0060713 A1* | 3/2011 | Harrison | G06F 21/604 706/47 |
| 2013/0269023 A1* | 10/2013 | Dilley | H04L 63/0218 726/14 |
| 2014/0359693 A1* | 12/2014 | Lemke | H04L 63/0263 726/1 |

OTHER PUBLICATIONS

Claims in European Application No. PCT/US2013/064325, dated Jan. 2015, 5 pages.
State Intellectual Property Office, "Search Report" in application No. 201380039427.6, dated Jun. 24, 2016, 4 pages.
China Claims in application No. 201380039427.6, dated Jun. 2016, 4 pages.

* cited by examiner

AUTONOMIC NETWORK SENTINELS

TECHNICAL FIELD

The present disclosure generally relates to the monitoring of a network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many systems require networks to be monitored for the occurrence of various network conditions. Examples of such systems are intrusion detection systems, fault management systems, and service level assurance systems.

According to one approach, a monitoring application resides outside the network and receives network data from various entities on a network. The monitoring application monitors the network for the occurrence of various network conditions by analyzing the data received from the network entities.

This approach can become problematic as networks grow larger and systems become more sophisticated. As the network grows larger, the number of entities providing data to the monitoring application increase. In addition, as the systems become more sophisticated, the number of network conditions to be detected also increase. In many cases, the increasing size of the network and increasing sophistication of the system can overburden the monitoring application, thus slowing down the detection of network conditions. Furthermore, maintaining the monitoring application often incurs additional expense and administrative efforts.

What is needed is an approach for more effectively monitoring a network for various network conditions, while also limiting the expense and administrative efforts that are needed to maintain the system.

DETAILED DESCRIPTION

Autonomic network sentinels are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Example Network Monitoring Process
   3.1 Rule Categories and Priority Values
   3.2 Selection of Rules for the Sample Set
   3.3 Rule Assessment
   3.4 Rule Match Notification
4.0 Implementation Mechanisms—Hardware Overview
5.0 Extensions and Alternatives 1.0 General Overview In an embodiment, an occurrence of a particular network condition is detected at a first network entity. The first network entity compares the particular network condition with one or more sample set rules of a first sample set of rules associated with the first network entity. The first sample set of rules comprise one or more rules from a full set of rules stored at a rule base. Each rule from the full set of rules represents a network condition and an action to be taken in response to an occurrence of the network condition. In response to determining that the particular network condition matches a particular rule from the first sample set of rules, the network entity notifies the rule base or one or more second network entities of the match. Each second network entity is associated with a second sample set of rules that is different than the first sample set of rules.

In an embodiment, the notifying causes a particular network entity of the one or more second networks entities to add the particular rule to the respective sample set associated with the particular network entity.

In an embodiment, a received set of rules is received from the rule base. A second sample set of the rules is selected from the received set of rules, where the second sample set is different than the first sample set.

In an embodiment, the selection of the first sample set of rules is based, in part, on priority information associated with a selected rule in the sample set of rules.

In an embodiment, the priority information is based, at least in part, on the number of rule match occurrences of the selected rule.

In an embodiment, the priority information is based, at least in part, on the number of network entities which include the selected rule in their associated sample sets.

In an embodiment, the priority information is based, at least in part, on an amount of time elapsed since the most recent occurrence of a rule match of the particular rule at any network entity of a set of network entities.

In an embodiment, each network entity in the set of network entities is determined to be similar to a target network entity.

2.0 Structural and Functional Overview

According to an embodiment, the various network entities of the network monitor the network for the occurrence of network conditions, thus functioning as autonomic network sentinels. The network entities may be capable of detecting the occurrence of local network conditions and may also have other functions within the network other than the monitoring of network conditions. For example, one or more of the network entities may be network routers. Other examples of network entities include switches, gateways, and any other element of network infrastructure, or any end station such as a printer, scanner, server, or storage system, having a networking stack and capable of hosting or executing the logic that is further described herein.

Each of the plurality of network entities is associated with a respective sample set of rules. The network entities assess the rules in their associated sample sets. The network entities assess rules by determining whether the network condition associated with the rule has occurred. Each sample set of rules is a different subset of a full rule set of rules stored at a rule base. Typically, the sample sets will not include every rule included in the full rule set of rules stored at a rule base, although in some embodiments, a sample set of a particular network entity may include each of the rules in the full set of rules. According to one or more of the various methods described herein, the occurrence of a rule match occurrence at one network entity causes the rule to be evaluated at other network entities.

Such an approach may provide various benefits. The monitoring of network conditions by network entities within the network saves time and processing power that, according to some other approaches, would be spent communicating information by the network entity to an external entity, such as a monitoring application that resides outside the network. Furthermore, by distributing the task of rules assessment to various network entities throughout the network, in part through the use of distributed samples of rules, a greater number of rules may be assessed at the same time without overburdening a single entity. In other words, in an embodiment, each network entity is not required to store or evaluate all rules that are defined in the network as a whole; instead, different network entities evaluate only samples of the rules defined in the network as a whole.

Distribution of sample sets of rules among different network entities may occur randomly or using other approaches. Additionally, according to certain embodiments, once a rule is matched, the news of the rule match is distributed to other network entities. The distribution may cause the rule to be added to the sample set of the other network entities. In some embodiments, this approach ensures that rules which have recently been matched, and therefore have a greater likelihood of occurring at other networks entities as well, are assessed more often than other rules.

In an embodiment, a particular network condition of interest may go undetected at a particular network entity because the rule corresponding to the network condition is not included in the sample set of the particular network entity. However, typically, although not always, the rule corresponding to the network condition would be included in the sample sets of many other network entities. Thus, if the network condition is severe enough to affect many network entities, there is a high chance that the rule corresponding to the network condition would match at one of the network entities. The rule match occurrence may, in turn, cause other network entities to add the particular matched rule to their own sample sets, thereby increasing the chances of the particular rule being detected throughout the network.

Figure 1:
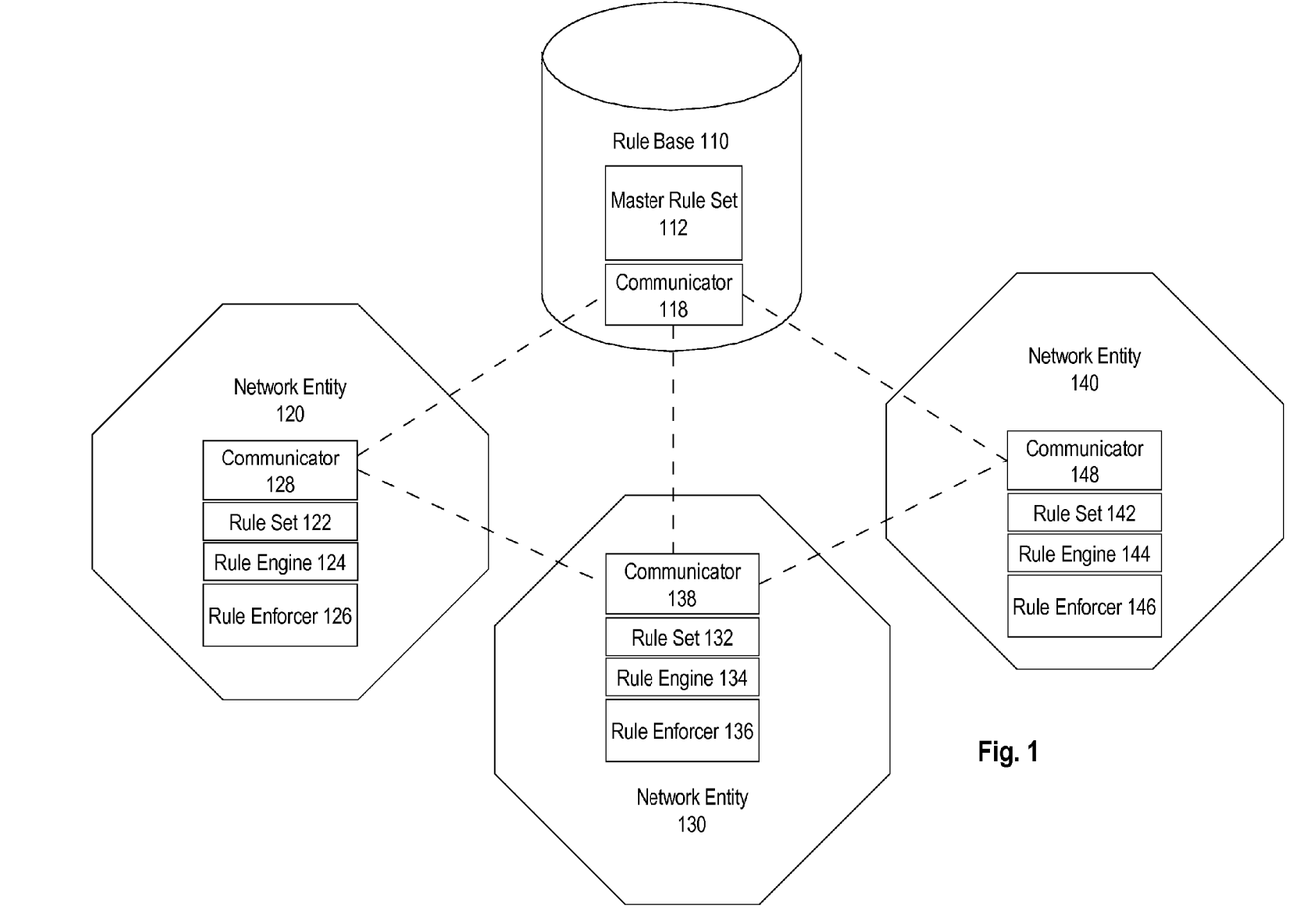
FIG. 1 illustrates an example network monitoring system.

FIG. 1 illustrates an example network monitoring system. Rule base 110 comprises a database or other repository comprising master rule set 112. Master rule set 112 comprises a full set of rules, where each rule represents a network condition whose occurrence is to be detected and an action to be taken in response to the detection. Rules in master rule set 112 may be defined through administrative action or may be compiled via automatic techniques. Network entities 120, 130, 140 respectively include rule sets 122, 132, 142. Rule sets 122, 132, 142 are sample sets that each include a subset of the rules included in master rule set 112. The rule sets may each include a different subset of rules. Rule sets 122, 132, 142 also may overlap; for example, rule sets 122, 132 each may contain one or more of the same rules. Rule sets 122, 132, 142 may reflect any combination of union, intersection, or disjoint set arrangements for rules in the sets.

Network entities 120, 130, and 140 respectively comprise communicators 128, 138, and 148. Communicators 128, 138, and 148 are capable of sending communications to and receiving communications from communicator 118 of rule base 110. For example, rule base 110 may be capable of sending rules or notifications of rule matches to network entities 120, 130, or 140. Network entities 120, 130, and 140 may also send communications to rule base 110, such as a request for a new set of rules.

The network entities may be capable of communicating rules or rule matches amongst each another. Communicators 128, 138, and 148 are capable of communicating amongst themselves. For example, one network entity may notify another network entity about a rule match that has been identified by one of the network entities as a result of a network condition occurrence.

Network entities 120, 130, and 140 respectively include rule engines 124, 134, and 144. The rule engines compare network condition information to the rules stored in the respective rule sets to determine if a rule match has occurred Network entities 120, 130, 140 include rule enforcers 126, 136, 146. The rule enforcers cause the action associated with a particular rule to be performed. The rule enforcer may cause the associated action to be performed in response to the rule engine determining that the particular rule has matched. For example, rule engine 124 assesses a particular rule by comparing information collected by network entity 120 about one or more network conditions to the particular rule. The rule is associated with a particular action and rule enforcer 126 causes the particular action to be performed in response to a determination that the network condition identified by the rule has occurred. In certain embodiments, a single entity performs both the functions of the rule engine and the rule enforcer.

In addition to storing rules, rule base 110 may store priority information about the rules, such as the categories to which the rules belong and rule base priority values associated with the rules. The rule base priority values associated with a rule or the category to which the rule belongs may indicate the priority of the rule as compared to other rules stored at the rule base. Using the processes and logic that are further described herein, the category or rule base priority values associated with the rule may affect the likelihood of the particular rule being selected to be included in the sample set of a particular network entity.

In an embodiment, the category to which a particular rule belongs or the rule base priority value associated with the particular rule is based, at least in part, on the number of other network entities that include the particular rule in their associated sample set of rules being assessed. If a rule is being assessed at a relatively large number of network entities, it may be associated with a rule base priority value or category which indicates a low priority for the rule. In an embodiment, the selection of rules is based on the priority indicated by the rule base priority value or category and such an approach may ensure that most, or all, of the rules are included in the sample set of at least one network entity.

The determination of the category to which a particular rule belongs or the rule base priority value associated with the particular rule may be based, at least in part, on the amount of time elapsed since the most recent time the particular rule matched at a network entity in a subset of network entities in the system or at any network entity in the system. In an embodiment, the subset of network entities includes only the network entities that are determined to be similar to a target network entity. For example, the subset of network entities may include only the network entities in the system that have a particular capability that is also possessed by the target network entity or only network entities that perform a particular type of function also performed by the target network entity.

The priority information for a rule may include a rule base priority value or category for the rule that is specific to a particular network entity. In other words, the rule may be associated with multiple rule base priority values and categories, where each rule base priority value or category is specific to a particular network device. For example, the rule base or an administrator may assign particular rule base priority value or category to the rule indicating a priority for the rule relative to a particular network device based on the amount of time elapsed since the most recent time the particular rule was included in the sample set of the particular network device. In an embodiment, a rule base priority value or category indicating a high priority for a rule is determined in response to a determination that the elapsed time was greater than a particular threshold amount of time.

As another example, the rule base or an administrator may determine a particular rule base priority value or category for a particular rule relative to a particular network entity based on the number of other network entities at which the particular rule has matched or based on the characteristics of the other network entities at which the particular rule has matched. For example, the rule base priority value of a particular rule relative to a particular network entity that performs routing functions may be determined based on whether the particular rule has matched at other network entities that perform traffic routing functions or based on the number of traffic routing network entities at which the rule has matched.

3.0 Example Network Monitoring Process

Figure 2:
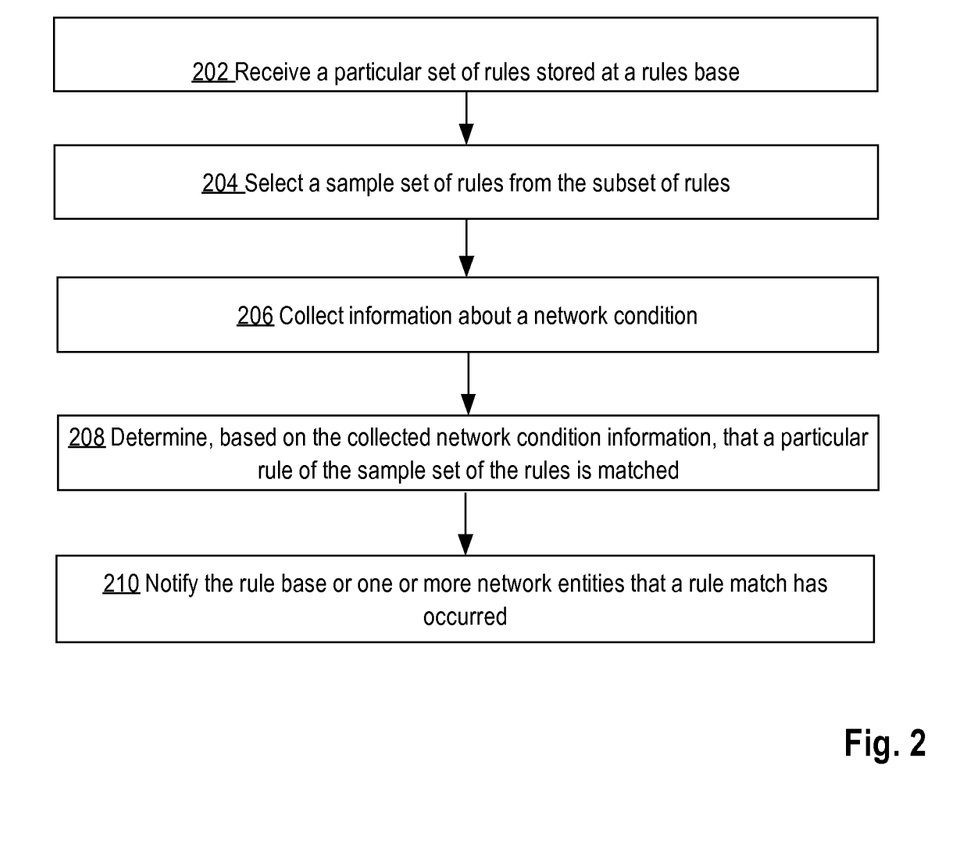
FIG. 2 is a block diagram illustrating an example network monitoring process.

FIG. 2 is a block diagram illustrating an example network monitoring process. The process may be implemented at a network entity, such as network entity 120; for example, the process of FIG. 2 may be implemented using one or more computer programs, other software elements, or other functional elements or logic that are stored, hosted or executed in or by a network entity.

At block 202, a particular set of rules stored at the rule base is received. The received particular set of rules may include all of the rules stored in a master rule set of a rule base such as master rule set 112 or may include only some of the rules stored in the master rule set. The particular set of rules may be received from the rule base in response to the network entity requesting a set of rules from the rule base.

3.1 Rule Categories and Priority Values

Both the category to which a rule belongs and the rule's rule base priority value may indicate the priority of a rule as compared to other rules stored at the rule base. For example, in an embodiment, the rules belonging to a "medium priority" category may only be selected for inclusion in the particular set of rules to be sent to a network entity or for inclusion in the rule's sample set if each of the rules belonging to a "high priority" category has already been assigned to the network entity or, in some embodiments, to another network entity in the network.

In another embodiment, the rules are selected from a set that includes rules from both the "medium priority" category and the "high priority" category. Such a result may be caused in a variety of ways. For example, the selection of a rule for a particular network entity may be based in part on weight values assigned to the rules. The rules belonging to the "medium priority" category may be assigned lower weight value than the weight values assigned to the rules belonging to the "high priority" category, where the weight value assignments cause the rules in the "high priority" category to be more likely to be selected than the rules belonging to the "medium priority" category. In some embodiments, such an approach ensures that rules belonging to the "high priority" category are selected for inclusion in more sample sets and are consequently evaluated at a greater number of network entities than the "medium priority" rules, while nevertheless ensuring that rules belonging to the "medium priority" category are occasionally selected for inclusion in sample sets and are still evaluated at some network entities.

In another embodiment, the likelihood of a rule being selected for inclusion in the particular set of rules to be sent to a network entity or for inclusion in the rule's sample set may be affected by the rule base priority value assigned to a rule. In an embodiment, one or both the rule base priority values and the categories are considered during the rule selection. According to one approach, a rule assigned a rule base priority value of "2" is only selected to be included in a sample set of a particular network entity if each rule assigned a rule base priority value of "1" has already been assigned to the particular network entity, or in some embodiments, to some network entity in the network. In another embodiment, a rule with a rule base priority value "1" is more likely to be assigned to a particular network entity as compared to a rule which is assigned a rule base priority value of "2," but such a result may not be guaranteed. For example, the rule assigned a rule base priority value of "1" may be assigned a weight value which causes the particular rule to be three times as likely to be selected as another rule with a rule base priority value of "2" which is assigned a different weight value.

The category to which a rule belongs or the rule base priority value associated with the rule, or both, may be determined based on a score associated with the rule. The score may be based, in part, on the number of network entities that have already included the rule in their respective rule sets. The score may also be determined based in part on the number of matches of the particular rule that have been detected by network entities assessing the rules. One or more of the scores, priority values, and categories assigned to a rule may be assigned or adjusted by an administrator.

3.2 Selection of Rules for the Sample Set

At block 204, the network entity selects a sample set of rules from the particular set of rules received by the network entity. The network entity may also receive priority information about the rules which, for example, indicates the categories to which the rules belong or priority values associated with the rules. In an embodiment, the network entity selects rules to include in the sample set of rules based on the received priority information. For example, the rules with high priority categories or high rule base priority values may have a greater likelihood of being included in the subset than the rules with low priority categories or low rule base priority values. The selection of the sample set may be based in part on the number of other network entities that have included the rule in their associated sample sets. For example, the selection of the sample set may be based in part on the category to which a rule belongs or the rule base priority values associated with the rule, which in turn may be based in part on the number of network entities that have included the rule in their associated sample sets. In other embodiments, the network entity randomly selects rules to include in the sample set from the received particular set of rules. The network entity may select rules for the sample set according to an algorithm which randomly determines rules for the network entity. For example, the algorithm may comprise determining a rule identifier to assign to a network entity based on the IP address or serial number of the network entity. Statistical sampling techniques may be used to select a sample of the rules at block 204.

The network entity which receives the particular set of rules may select a sample set of rules from the particular set of rules based on its own characteristics. In some embodiments, the sample set of rules may be selected based on the type of network condition information that is collected by the network entity. For example, if the network entity is not capable of determining traffic speed, the network entity may not select any rules whose associated network condition pertains to the speed of the traffic.

In an embodiment, after selecting the sample set, the network entity sends a sample set selection update to the rule base. The update indicates which rules have been selected to be included in the sample set. Based on the update, the rule base may update a priority value associated with the selected rule or categorize the rule into a different category. The update to the priority value or the reassignment to a new category may decrease the likelihood of assigning the rule to another network entity.

3.3 Rule Assessment

At block 206, the network entity collects information about one or more network conditions. At least some of the collected information may be used to determine whether a network condition identified in a particular rule has occurred. The network condition may be, for example, one or more particular network events, a particular type of network traffic, other traffic characteristics such as the speed of the traffic flow occurring at, above or below a particular threshold, a particular traffic patterns, or relating a property of the network entity such as memory or CPU utilization. The collected information may be information which is directly observed by the network entity.

At block 208, based on the collected network condition information, the network entity determines that a particular rule of the sample set of the rule has matched. A rule matches at a particular network entity if the network entity detects an occurrence of the network condition that is represented by the particular rule. The particular rule may be associated with a particular action, and the network entity may cause the particular action to occur in response to the determination of a rule match. The rule engine module of the network entity may determine that the particular network condition associated with the rule has occurred and thus the rule has matched. In response to the rule engine module determining that the particular network condition associated with the rule has occurred, the rule enforcer module may then cause the associated action to occur.

The associated action may be an action to be performed by the network entity which determines the occurrence of the particular network condition associated with the rule. In an embodiment, the rule match indicates the occurrence of a network threat, network performance issue, or a network fault and the associated action mitigates the threat, performance issue, or fault or provides information about the threat, performance issue, or fault. For example, the action to be performed by the network entity may be to collect further information about the network condition, to send collected information or other operational data to a separate entity for diagnosis, or for the network entity to terminate operations.

3.4 Rule Match Notification

At block 210, the network entity distributes the news of a rule match by notifying the rule base or one or more network entities that a rule match has occurred. The network entity may send a rule match notification notifying the rule base or the one or more network entities of the rule match in response to detecting that the network condition of the particular rule has occurred. The network entity may send the rule match notification to one or more other network entities which are associated with sample sets that are different than the sample set associated with the network entity at which the rule match is detected. The rule match notifications may identify the particular rule that matched.

Figure 3:
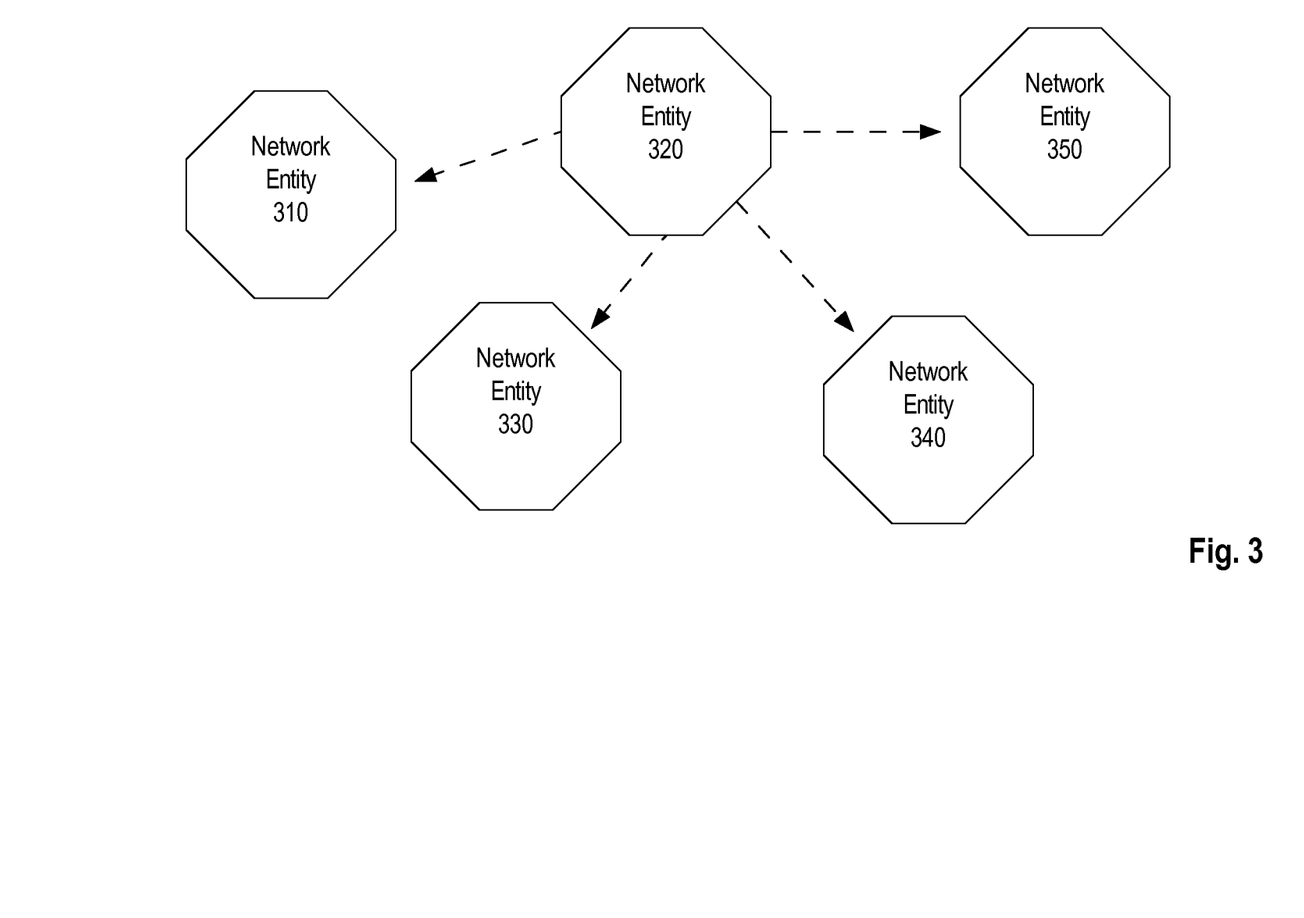
FIG. 3 illustrates an example approach for notifying various network entities of a rule match.

The news of the rule match may be distributed in different ways according to different embodiments. FIG. 3 illustrates an example approach for notifying various network entities of the rule match. The system of network entities includes network entities 310, 320, 330, 340, and 350. According to the example approach of FIG. 3, the network entity at which the rule match is detected ("rule match network entity") may notify each of the other network entities in the system. For example, in response to network entity 320 detecting the occurrence a rule match, network entity 320 notifies network entities 310 and 330-350 of the rule match.

In another embodiment, the rule match network entity notifies a subset of network entities in the network, such as only the network entities that belong to a particular classification of network entities. All network entities that belong to the same classification as the rule match network entity may be notified. The classifications may be based on the function of the network entity within the network. For example, one classification may include network entities whose function is to monitor for the occurrence of security threats and other another classification may include network entities that monitor for the quality of service within the network. As another example, all entities having one or more particular operating system installed may be notified.

Figure 4:
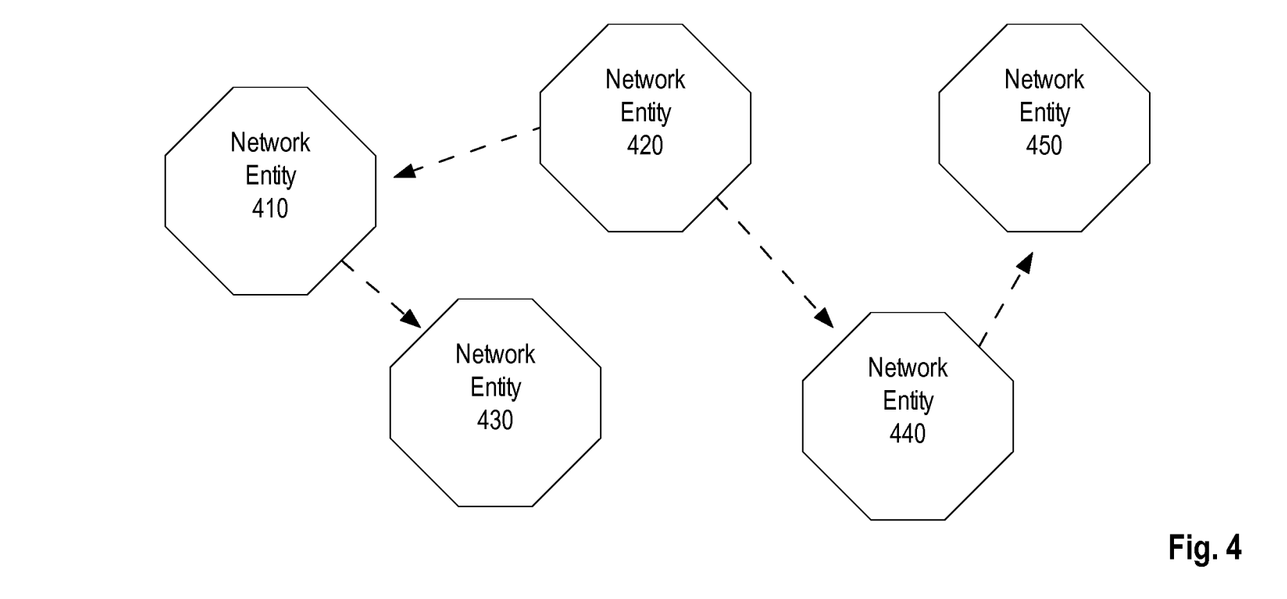
FIG. 4 illustrates another example approach for notifying various network entities of the rule match.

FIG. 4 illustrates another example approach for notifying various network entities of the rule match. In an embodiment, the rule match network entity notifies one or more other network entities, and, in response to receiving the rule match notification, one or more of the notified network entities notify one or more additional network entities. For example, in response to a rule match occurring at network entity 420, network entity 420 notifies network entities 410 and 440. In response to network entity 410 receiving notification of the rule match, network entity 410 notifies network entity 430 of the rule match. In response to network entity 340 receiving notification of the rule match, network entity 440 notifies network entity 450 of the rule match. Network entities 430 and 450 may then also notify other network entities of the rule match.

Figure 5:
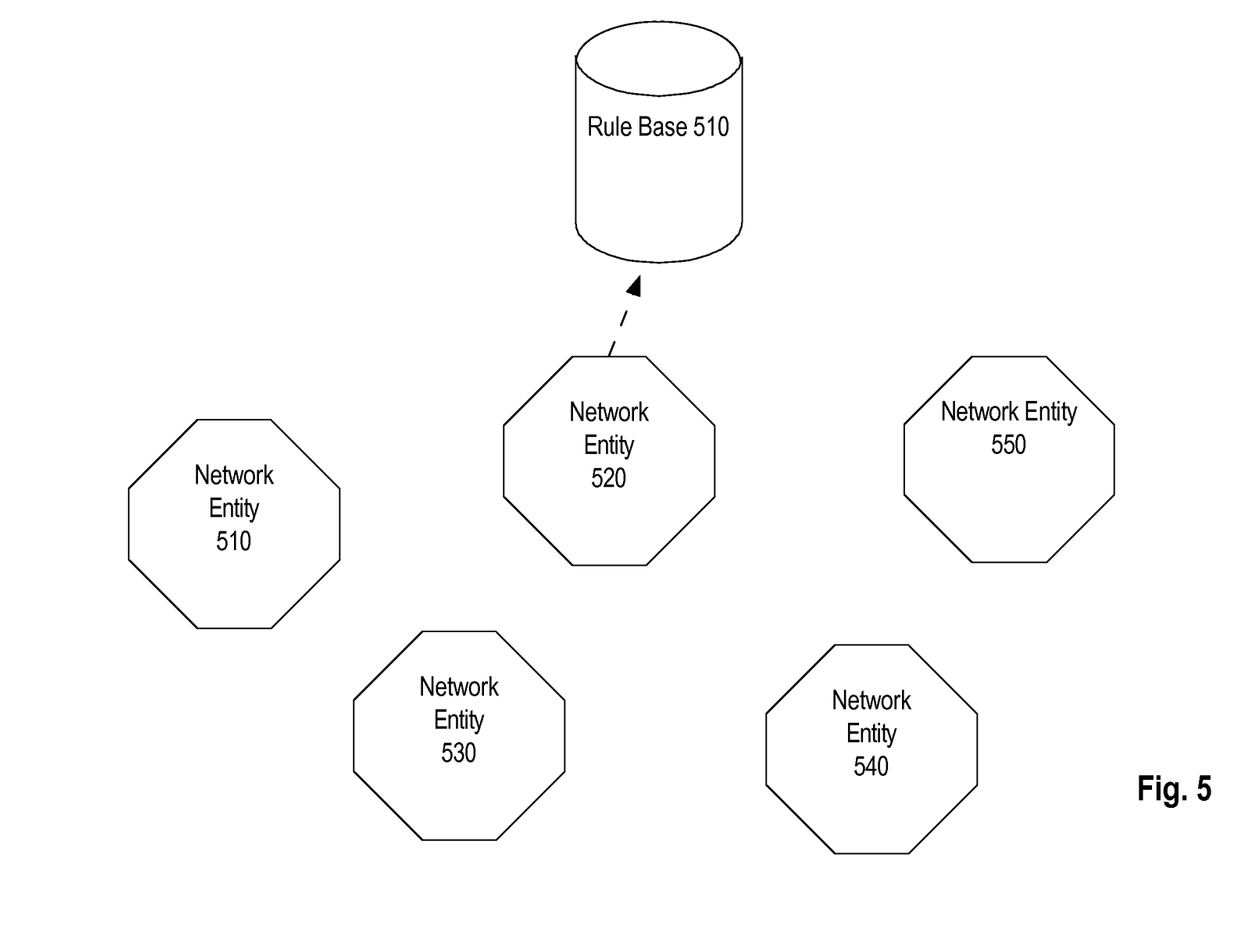
FIG. 5 illustrates another example approach for notifying various network entities of the rule match.

FIG. 5 illustrates another example approach for notifying various network entities of the rule match. For example, in response to network entity 520 determining the occurrence of a rule match, network entity 520 sends a rule match notification to rule base 110 of notifying the rule base of the rule match. In response to receiving the rule match notification, rule base 510 may notify one or more of network entities 510 and 530-550. In another embodiment, in response to receiving the rule match notification, rule base 510 modifies information stored at the rule base about the matched rule. For example, the rule base may adjust one or more of the score, priority value, or category associated with the matched rule in response to the rule match. In some embodiments, the adjustment increases the likelihood that the matched rule will be selected for inclusion in the sample set(s) of one or more other network entities because the selection of rules is based in part on the scores, priority values, and categories associated with the rules.

The occurrence of a rule match may cause one or more other network entities to refresh their associated sample sets. For example, in response to determining the occurrence of a rule match, the rule match network entity or the rule base may send rule match notifications to the one or more other network entities notifying the one or more other network entities that a rule match has occurred. In response to receiving the notification, the other network entities may send a request for a set of rules to the rule base. The rule base may send a new set of rules to one or more network entities which is different than a prior set of rules which was sent to the same network entities, where the new set of rules includes the matched rule. In another embodiment, the rule match network entity sends a rule match notification to the rule base in response to detecting a rule match, and the rule base automatically sends sets of rules to the other network entities in response to receiving a rule match notification from the rule match network entity.

In an embodiment, the sample sets of one or more network entities in the system are updated periodically or at predetermined time intervals rather than automatically in response to the occurrence of a rule match. The updating of a sample set may include adding, removing, or replacing rules in the sample set with new rules or changing the prioritization of rules in the sample set. A network entity may update its associated sample set in response to receiving a new set of rules from the rule base or in response to the network entity selecting a new sample set of rules from a received set of rules. Either the selection of the new set of rules or the new sample sets may be based on the priority values or the categories of the rules, which are updated prior to the selection in response to the rule match occurrence. In such an embodiment, the rule base may update priority information associated with a rule in response to one of the network entities detecting a rule match occurrence of the particular rule, such that the rule is indicated to be of higher priority after the update. In some embodiments where network entities consider priority information during the selection of a sample set, the update to the priority information would thus increase the likelihood of the particular rule being selected to be in the sample sets of other network entities.

One or more network entities that have been notified of a rule match may add the particular rule of the rule match notification to their respective sample set in response to receiving the rule match notification. In some embodiments, in response to a particular network entity receiving indication that a rule match has occurred at some other network entity, the particular network entity requests a new set of rules from the rule base.

4.0 Implementation Mechanisms—Hardware Overview

Figure 6:
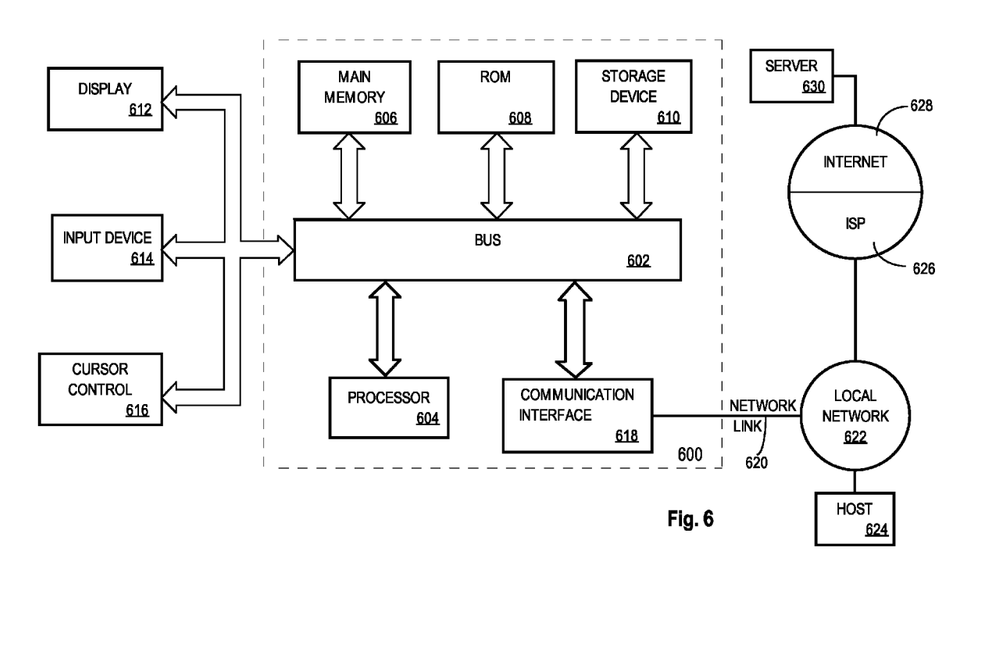
FIG. 6 illustrates a computer system upon which an embodiment may be implemented

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus, comprising:
    a network interface that is coupled to a data network for receiving one or more packet flows therefrom;
    a processor;
    one or more stored sequences of instructions which, when executed by the processor, cause the processor to perform:
    detecting, at a first network entity, an occurrence of a particular network condition;
    comparing, by the first network entity, the particular network condition with one or more sample set of rules of a first sample set of rules that are associated with the first network entity, wherein the first sample set of rules is a subset of rules from a full set of rules that is stored at a rule base, wherein each rule from the full set of rules represents a network condition and an action to be taken in response to an occurrence of the network condition; and
    in response to determining that the particular network condition matches a particular rule from the first sample set of rules, notifying, by the first network entity, the rule base or one or more second network entities of the match between the particular network condition and the particular rule from the first sample set of rules, wherein each second network entity is associated with a second sample set of rules comprising at least one rule that is different than in the first sample set of rules and comprising a subset of rules from the full set of rules;
    wherein the notifying causes a particular network entity of the one or more second network entities to add the particular rule to a respective sample rule set associated with the particular network entity.

2. The apparatus of claim 1, wherein the one or more stored sequences of instructions, when executed by the processor, cause the processor to further perform:
    receiving, from the rule base, a received set of rules;
    selecting, from the received set of rules, a third sample set of rules, wherein the third sample set is different than the first sample set.

3. The apparatus of claim 1, wherein the first sample set of rules is selected based, at least in part, on priority information associated with a selected rule in the sample set of rules.

4. The apparatus of claim 3, wherein said priority information is based, at least in part, on the number of rule match occurrences of the selected rule.

5. The apparatus of claim 3, wherein said priority information is based, at least in part, on the number of network entities which include the selected rule in their associated sample sets.

6. The apparatus of claim 3, wherein said priority information is based, at least in part, on an amount of time elapsed since the most recent occurrence of a rule match of the particular rule at any network entity of a set of network entities.

7. The apparatus of claim 6, wherein each network entity in the set of network entities is determined to be similar to a target network entity.

8. A method comprising:
    detecting, at a first network entity, an occurrence of a particular network condition;
    comparing, by the first network entity, the particular network condition with one or more sample set of rules of a first sample set of rules associated with the first network entity, the first sample set of rules comprising a subset of rules from a full set of rules stored at a rule base, each rule from the full set of rules representing a network condition and an action to be taken in response to an occurrence of the network condition; and in response to determining that the particular network condition matches a particular rule from the first sample set of rules, notifying, by the first network entity, the rule base or one or more second network entities of the match between the particular network condition and the particular rule from the first sample set of rules, each second network entity being associated with a second sample set of rules comprising at least one rule that is different than in the first sample set of rules;

wherein the notifying causes a particular network entity of the one or more second network entities to add the particular rule to a respective sample rule set associated with the particular network entity.

9. The method of claim 8, wherein, the method further comprises:

receiving, from the rule base, a received set of rules;

selecting, from the received set of rules, a third sample set of rules, wherein the third sample set is different than the first sample set.

10. The method of claim 8, wherein the first sample set of rules is selected based, at least in part, on priority information associated with a selected rule in the sample set of rules.

11. The method of claim 10, wherein said priority information is based, at least in part, on a number of rule match occurrences of the selected rule.

12. The method of claim 10, wherein said priority information is based, at least in part, on the number of network entities which include the selected rule in their associated sample sets.

13. The method of claim 10, wherein said priority information is based, at least in part, on an amount of time elapsed since the most recent occurrence of a rule match of the particular rule at any network entity of a set of network entities.

14. The method of claim 13, wherein each network entity in the set of network entities is determined to be similar to a target network entity.

15. A non-transitory computer-readable storage medium storing one or more sequences of instructions which, when executed by one or more processors, cause the processors to perform:

detecting, at a first network entity, an occurrence of a particular network condition;

comparing, by the first network entity, the particular network condition with one or more sample set of rules of a first sample set of rules that are associated with the first network entity, wherein the first sample set of rules is a subset of rules from a full set of rules that is stored at a rule base, wherein each rule from the full set of rules represents a network condition and an action to be taken in response to an occurrence of the network condition; and in response to determining that the particular network condition matches a particular rule from the first sample set of rules, notifying, by the first network entity, the rule base or one or more second network entities of the match between the particular network condition and the particular rule from the first sample set of rules, wherein second network entity is associated with a second sample set of rules comprising at least one rule that is different than in the first sample set of rules and comprising a subset of rules from the full set of rules;

wherein the notifying causes a particular network entity of the one or more second network entities to add the particular rule to a respective sample rule set associated with the particular network entity.

16. The computer-readable storage medium of claim 15, wherein the one or more stored sequences of instructions, when executed by the processor, cause the processor to further perform:

receiving, from the rule base, a received set of rules;

selecting, from the received set of rules, a third sample set of rules, wherein the third sample set is different than the first sample set.

17. The computer-readable storage medium of claim 15, wherein the first sample set of rules is selected based, at least in part, on priority information associated with a selected rule in the sample set of rules.

18. The computer-readable storage medium of claim 17, wherein said priority information is based, at least in part, on the number of rule match occurrences of the selected rule.

19. The computer-readable storage medium of claim 17, wherein said priority information is based, at least in part, on the number of network entities which include the selected rule in their associated sample sets.

20. The computer-readable storage medium of claim 17, wherein said priority information is based, at least in part, on an amount of time elapsed since the most recent occurrence of a rule match of the particular rule at any network entity of a set of network entities.

21. The computer-readable storage medium of claim 20, wherein each network entity in the set of network entities is determined to be similar to a target network entity.

* * * * *